(12) United States Patent
Jung et al.

(10) Patent No.: US 9,116,393 B2
(45) Date of Patent: Aug. 25, 2015

(54) METHOD OF MANUFACTURING AN ALIGNMENT SUBSTRATE AND LIQUID CRYSTAL DISPLAY PANEL HAVING THE SAME

(75) Inventors: Kyungho Jung, Yongin-si (KR); Sin-Doo Lee, Seoul (KR); SeungChul Park, Seoul (KR); Jun-Hee Na, Seoul (KR); Jinhwan Kim, Suwon-si (KR)

(73) Assignees: Samsung Display Co., Ltd. (KR); SNU R&DB FOUNDATION (KR)

( * ) Notice: Subject to any disclaimer, the term of this patent is extended or adjusted under 35 U.S.C. 154(b) by 438 days.

(21) Appl. No.: 13/485,644

(22) Filed: May 31, 2012

(65) Prior Publication Data

US 2013/0088678 A1 Apr. 11, 2013

(30) Foreign Application Priority Data

Oct. 6, 2011 (KR) .................. 10-2011-0102021

(51) Int. Cl.
*G02F 1/1337* (2006.01)
*G02F 1/1339* (2006.01)
(52) U.S. Cl.
CPC .............. *G02F 1/133707* (2013.01); *G02F 2001/133742* (2013.01); *G02F 2201/40* (2013.01)

(58) Field of Classification Search
CPC ............................... G02F 2001/133742
USPC .................. 349/123–136, 155–157
See application file for complete search history.

(56) References Cited

U.S. PATENT DOCUMENTS

| | | | |
|---|---|---|---|
| 5,885,669 A | 3/1999 | Morgans et al. | |
| 2011/0090441 A1* | 4/2011 | Sasabayashi et al. | 349/123 |
| 2011/0194055 A1* | 8/2011 | Kodama et al. | 349/112 |

FOREIGN PATENT DOCUMENTS

| | | |
|---|---|---|
| JP | 11-109328 A | 4/1999 |
| JP | 2011-048189 A | 3/2011 |
| KR | 1020060066484 A | 6/2006 |

* cited by examiner

*Primary Examiner* — Paul Lee
(74) *Attorney, Agent, or Firm* — Innovation Counsel LLP

(57) ABSTRACT

A liquid crystal display panel may include a first substrate, a second substrate facing the first substrate and including a plurality of colloidal particles obtained by thermally treating a surface of the second substrate facing the first substrate, and a liquid crystal layer interposed between the first and second substrates to contain liquid crystal molecules. The size of each of the plurality of colloidal particles may vary according to the length of time heat is applied.

9 Claims, 12 Drawing Sheets

METHOD OF MANUFACTURING AN ALIGNMENT SUBSTRATE AND LIQUID CRYSTAL DISPLAY PANEL HAVING THE SAME

CROSS-REFERENCE TO RELATED APPLICATIONS

This U.S. non-provisional patent application claims priority under 35 U.S.C. §119 to Korean Patent Application No. 10-2011-0102021, filed on Oct. 6, 2011, in the Korean Intellectual Property Office, the entire contents of which are hereby incorporated by reference.

BACKGROUND OF THE INVENTION

Embodiments of the inventive concepts relate generally to a method of manufacturing an alignment substrate and a liquid crystal display panel having the same.

A liquid crystal display panel typically includes a first substrate having a plurality of pixel electrodes, a second substrate facing the first substrate and having a common electrode, and a liquid crystal layer interposed between the first and second substrate. When a voltage is applied between the pixel electrode and the common electrode, an arrangement of liquid crystal molecules in the liquid crystal layer may be changed to adjust optical transmittance through the display panel, and an image can be displayed.

Liquid crystal display panels have, generally, one of two operating modes: a twisted nematic (TN) mode and a vertical alignment (VA) mode. In a TN mode device, the liquid crystal molecules interposed between the first and second substrates have an initial orientation in which the molecules are twisted by 90 degrees. When an electric field is applied, the molecules untwist in proportion to the electric field and the orientation of the liquid crystal molecules is re-arranged in a direction of the applied electric field. In a VA mode device, liquid crystal molecules with negative dielectric anisotropy may be used. In this case, the liquid crystal molecules have an initial orientation vertical (i.e. perpendicular) to a top surface of the first substrate, and when an electric field is applied, the orientation of the liquid crystal molecules may be re-arranged, or tilted, by an applied electric field.

Since VA mode devices were initially developed, there have been many techniques devised for realizing a wide viewing angle. For example, MVA or PVA mode devices having a protrusion or slit provided on the second substrate. In the MVA and PVA mode devices, directors of the liquid crystal molecules may be oriented toward several different directions, and this enables improved wider viewing angle.

In addition, to diversify orientations of the liquid crystal molecules, a method of manufacturing an alignment substrate has been developed in which a surface structure is provided. The surface structure may be formed by forming particles, on the substrate having sizes on the order of micrometers or nanometers. The alignment substrate may be a substrate including an alignment layer. Due to the presence of the surface structure, the orientation of liquid crystal can be diversified, such that the liquid crystal display panel can have an improved viewing angle property.

Generally, the particles are provided on a substrate using a spraying method. In this case, the particles may be weakly attached on the substrate, such that they may be removed from or relocated on the substrate by an external impact or a flow of fluid occurring on the substrate. As a result, the number of particles provided on the substrate may be reduced, and this may lead to a deterioration in the viewing angle. Furthermore, to diversify the size of the particles, colloidal particles having a desired size should be independently prepared. This may result in an increase of manufacturing cost.

Particles having a particle size on the order of micrometers or nanometers are typically used for such alignment substrates. If metallic particles are used, a deterioration of brightness can occur because the metallic particles are opaque.

SUMMARY

A method of manufacturing an substrate with a stable surface structure whose size may be controlled is provided, and a liquid crystal display panel including the substrate is also provided.

The method of manufacturing the substrate can prevent brightness of a display panel from being deteriorated.

According to one aspect, a liquid crystal display (LCD) panel may include a first substrate, a second substrate facing the first substrate and including a plurality of colloidal particles attached to a surface of the second substrate facing the first substrate by a thermal treatment, and a liquid crystal layer including liquid crystal molecules interposed between the first and second substrates to contain liquid crystal molecules. A size of the colloidal particles varies according to a length of time the thermal treatment is applied.

The first substrate may include a first base substrate and a plurality of pixel electrodes provided on the first base substrate, and the second substrate may include a second base substrate and a common electrode provided on the second base substrate. The plurality of colloidal particles may be formed on the common electrode.

The plurality of colloidal particles may be disposed randomly on the common electrode.

The plurality of colloidal particles may be formed of a transparent material. The plurality of colloidal particles may be formed of at least one of polystyrene, polyethylene or polypropylene.

According to another aspect, a method of manufacturing an alignment substrate may include preparing a substrate, forming a common electrode on the substrate, disposing a colloid solution having the plurality of colloidal particles on the common electrode, dispersing the colloid solution on the common electrode, and applying a thermal energy to the colloid solution on the common electrode to attach the plurality of colloidal particles on the common electrode. A mean size of colloidal particles is controlled by adjusting the length of time the thermal energy is applied to the colloid solution on the common electrode.

BRIEF DESCRIPTION OF THE DRAWINGS

Example embodiments will be more clearly understood from the following description taken in conjunction with the accompanying drawings. The accompanying drawings represent non-limiting, example embodiments as described herein.

DETAILED DESCRIPTION

Hereinafter, example embodiments of the inventive concepts will be described more fully with reference to the accompanying drawings, in which example embodiments are shown.

Figure 1:
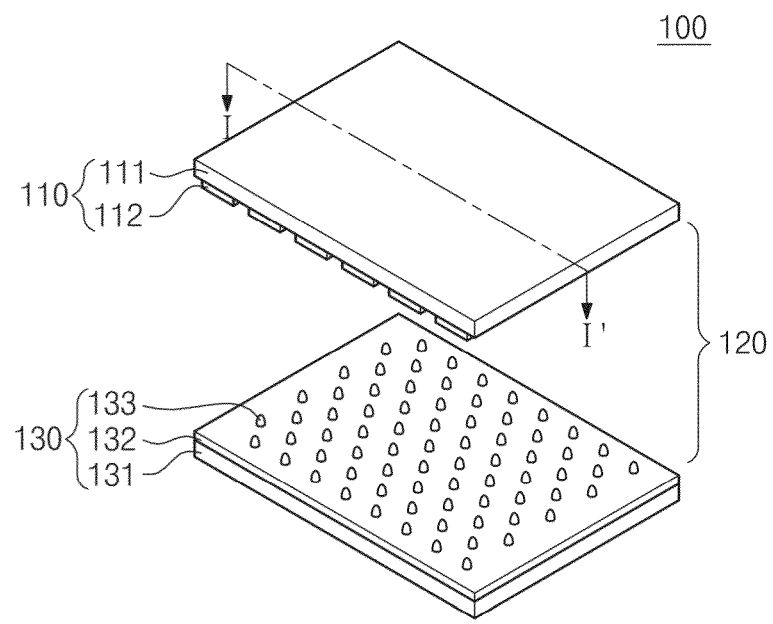
FIG. 1 is a perspective view of a liquid crystal display panel according to example embodiments.
Figure 2:
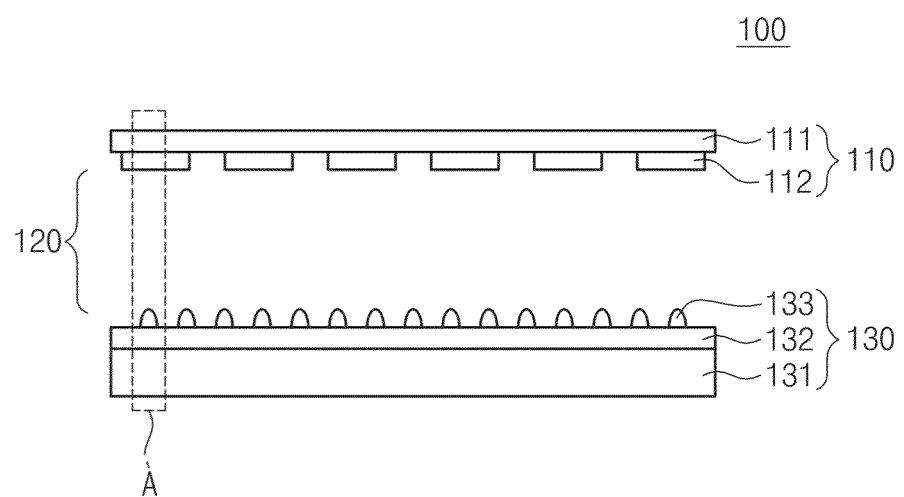
FIG. 2 is a sectional view taken along a line I-I' of FIG. 1.

FIG. 1 is a perspective view of a liquid crystal display panel according to example embodiments, and FIG. 2 is a sectional view taken along a line I-I' of FIG. 1.

Referring to FIGS. 1 and 2, a liquid crystal display panel 100 may include a first substrate 110, a second substrate 130 facing the first substrate 110, and a liquid crystal layer 120 interposed between the first and second substrates 110 and 130. The second substrate 130 may include a plurality of colloidal particles 133 that are formed on a surface thereof facing the first substrate 110. The colloidal particles 133 (hereinafter, "particles") may be thermally treated to form a surface structure. In some embodiments, the particles 133 may have a particle size on the order of nanometers. In order to reduce complexity in the drawings, FIGS. 1 and 2 show particles 133 regularly arranged, but the particles 133 may be randomly arranged. A temperature of the thermal treatment used to form the surface structure is in the range of 180° C. to 250° C., more particularly 200° C. to 220° C.

The liquid crystal layer 120 may include a plurality of liquid crystals (not shown). The particles 133 include, for example, a polymer resin. In some embodiments, the particles 133 may be formed of, for example, polystyrene that exhibits a transparent property or a high optical transmittance.

The first substrate 110 may include a first base substrate 111 and a plurality of pixel electrodes 112 provided on the first base substrate 111. The second substrate 130 may include a second base substrate 131, a common electrode 132 provided on the second base substrate 131, and a plurality of thermally treated particles 133 forming the surface structure provided on the common electrode 132. The surface structure may be attached onto the common electrode 132 of the second substrate 130 by heat applied thereto, and the size of the particles 133 that form the surface structure may be changed depending on the amount of time that the heat is applied.

Although not depicted in the drawings, the first substrate 110 may further include a first alignment layer provided on a plurality of pixel electrodes 112, and the second substrate 130 may further include a second alignment layer provided on the surface structure. Alignment of the liquid crystal layer 120 may be determined by the first and second alignment layers.

FIGS. 3A through 3D are schematic diagrams illustrating a method of forming a surface structure on the second substrate depicted in FIGS. 1 and 2.

Figure 3A:
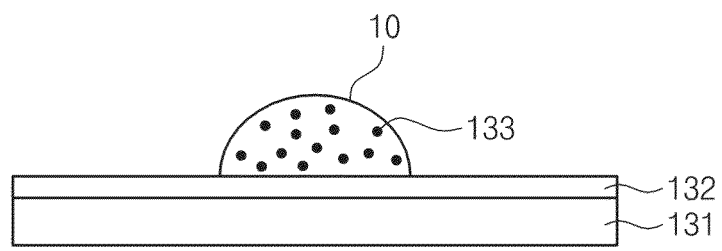
FIGS. 3A through 3D are schematic diagrams illustrating a method of forming a surface structure depicted in FIGS. 1 and 2.
Figure 3B:
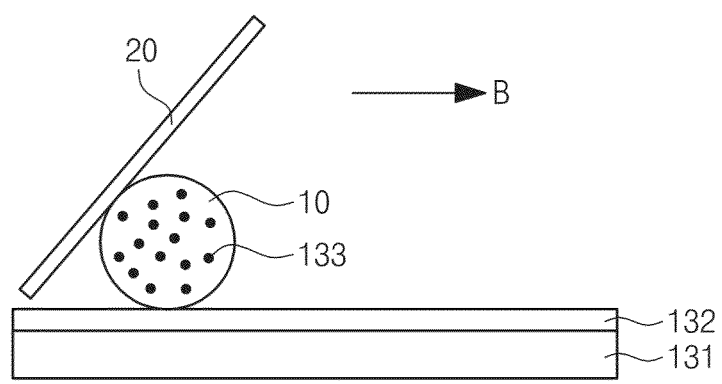
Figure 3C:
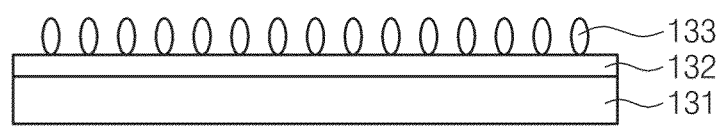
Figure 3D:
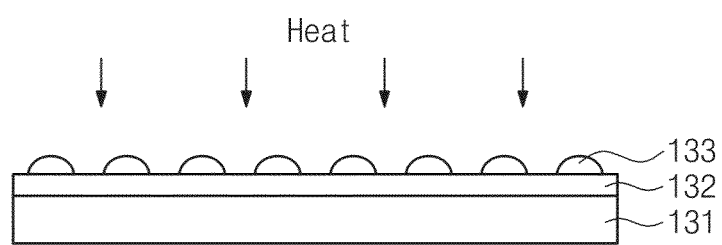

FIG. 3A is a schematic diagram illustrating a process of forming the particles 133 in a spin coating method, and FIG. 3B is a schematic diagram illustrating a process of forming the particles 133 in a coating method using a squeegee. FIG. 3C is a schematic diagram illustrating the particles 133 formed on the common electrode 132 in the spin coating method or the coating method using the squeegee, slit coating method, and FIG. 3D is a schematic diagram illustrating the particles 133 attached on the common electrode 132 by a thermal treatment. In order to reduce complexity in the drawings, FIGS. 3C and 3D show the particles 133 regularly arranged, but the particles 133 may be randomly arranged. Although not shown in figures, a slit coating method may be used to process of forming the particles 133.

Referring to FIG. 3A, the common electrode 132 may be formed on the second base substrate 131, and a solution 10 or a colloidal solution, in which the particles 133 are mixed, may be provided on the common electrode 132. The second substrate 130 is spun by spin device (not shown) connected to the bottom of the second substrate 130, and the solution 10 may be dispersed on the common electrode 132 by the spinning via the spin device. Using the spin-coating method, and the particles 133 that are mixed into the solution 10 may be disposed on the common electrode 132. In the case in which a spin-coating method is used for dispersing the solution 10, the particles 133 may be randomly dispersed on and across the surface of the common electrode 132.

Referring to FIG. 3B, the common electrode 132 may be formed on the second base substrate 131, and a solution 10 or a colloidal solution, in which the particles 133 are mixed, may be provided on the common electrode 132. A squeegee 20 may be prepared to disperse the solution 10 on the common electrode 132. In some embodiments, the squeegee 20 may be slanted with respect to the common electrode 132 as shown in FIG. 3B. The squeegee 20 may be moved along a direction B as depicted in FIG. 3B to disperse the solution 10 on the common electrode 132. As a result, the particles 133 mixed in the solution 10 may be disposed on and across the surface of the common electrode 132. In the case in which the coating method using the squeegee is used for dispersing the solution 10, the particles 133 may be uniformly or regularly dispersed on the common electrode 132.

In some embodiments, the solvent in which the particles 133 are mixed to form solution 10 may be, for example, a triple distilled water or a deionized water. After dispersing the solution 10 on the common electrode 132, the solvent may be evaporated and removed from the common electrode 132, for example, in a spinning manner, to leave the particles 133. Even if a portion of the solvent remains, the remaining portion of the solvent may be vaporized by the heat that is subsequently applied to attach the particles 133 to the common electrode 312.

Referring to FIG. 3C, the solvent may be removed by the evaporating or spinning process to leave the particles 133 on the common electrode 132.

Referring to FIG. 3D, the particles 133 disposed on the common electrode 132 may be thermally treated, and the particles 133 may be attached to the common electrode 132 by the thermal treatment. In addition, an increase in the length of time that heat is applied may lead to a reduction in the height of the particle 133 and an increase in an area of the particles 133 that is attached on the common electrode 132.

As a result of the thermal treatment, the surface structure formed by the particles 133 may be thermally attached to the second substrate, and a size of the particles 133 that form the surface structure may be changed depending on the length of time that heat is applied. This enables stable attachment of the particles 133 having a predetermined size to the second substrate 130. In addition, the particles 133 may be formed of a material exhibiting a transparent property or a high optical transmittance, and thus, it is possible to prevent reduction in the brightness of the display panel from the particles 133.

Example embodiments may not be limited to the above-described examples, in which polystyrene is used for the particles 133. For example, the particles 133 may be formed of any transparent material that can be formed by a coating process (for example, Spin coating, slit coating, inkjet coating and squeegee coating process, etc) and be thermally attached to a surface. In other embodiments, the particles 133 may be formed of a non-metallic material, such as, for example, polyethylene and polypropylene.

Figure 4:
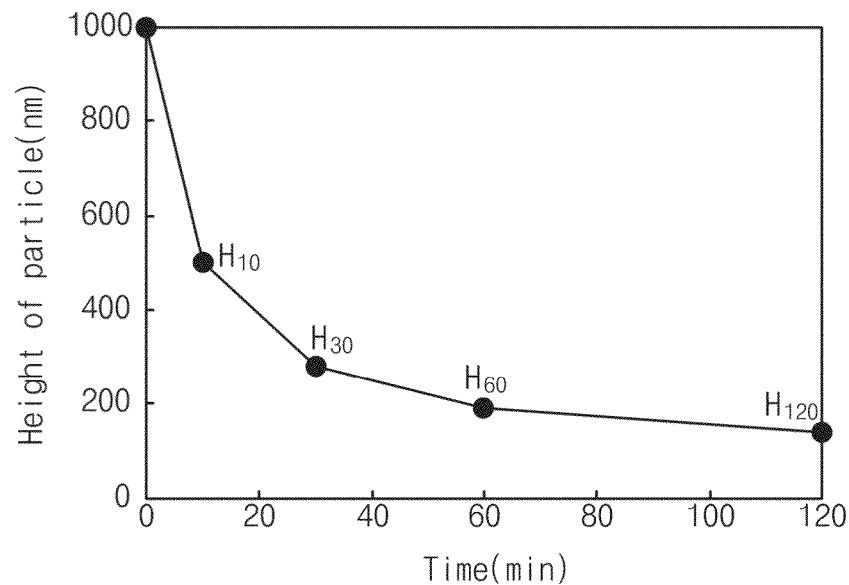
FIG. 4 is an experimental graph showing variation in the height of the surface structure according to a heat applying time.

FIG. 4 is an experimental graph showing a variation in height of the surface structure as a function of the length of time heat is applied when forming the surface structure. In the examples used to measure the height of the surface structure in FIG. 4, the surface structure was heated to a temperature of about 200 degrees Celsius, and the horizontal and vertical axes represent the length of time heat is applied (in minutes) and the variation in height of particles, respectively.

As indicated at the points identified by the reference numerals $H_{10}$, $H_{30}$, $H_{60}$ and $H_{120}$ of FIG. 4, respectively, a height of the particles forming the surface structure was 500 nm, 240 nm, 200 nm and 180 nm, for the heating times of 10, 30, 60 and 120 minutes. Thus, in the case in which the temperature applied to particle 133 is about 200 degrees Celsius, the height of the particle is varies between 500 nm to 180 nm. In other words, the height of the particle was inversely proportional to the length of time heat is applied.

Although not depicted in FIG. 4, a reduction in particle height leads to an increase in an area of the particles that is attached to the second substrate 130, because the reduction in particle height results from a thermal melting, and spreading, of the particles 133 on the surface. In other words, the area of the particles attached to the second substrate 130 may be directly proportional to the length of time heat is applied.

Figure 5:
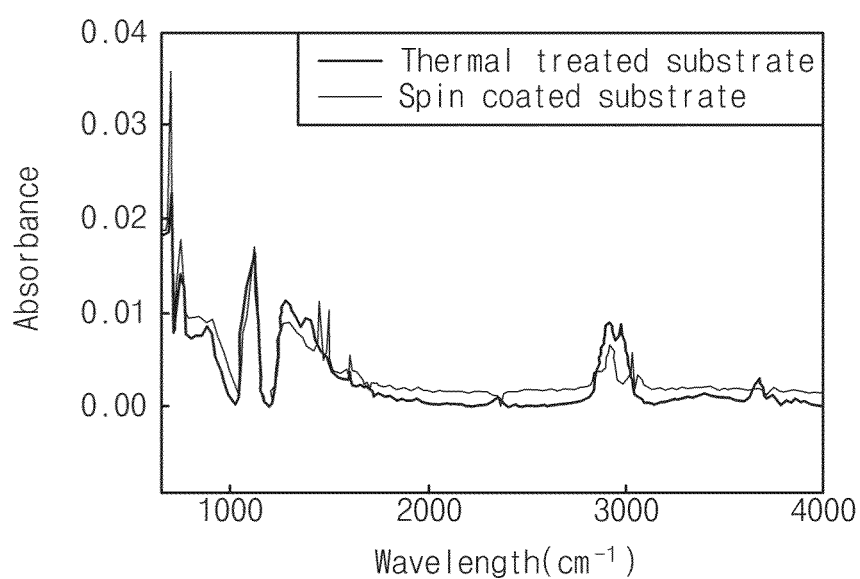
FIG. 5 is an experimental graph showing a Fourier-transform-infrared spectroscopy (FTIR) of particles in a thermally treated surface structure.

FIG. 5 is an experimental graph showing a Fourier-transform-infrared spectroscopy (FTIR) of particles in surface structure. In the graph of FIG. 5, the FTIR spectrum outlined with the thin line was obtained from particles formed on a substrate using a spin coating method, and the FTIR spectrum outlined with the thick line was obtained from particles disposed on a substrate with the spin-coating method and then heated to a temperature of about 200 degrees Celsius to. In other words, the spin coated particles having the FTIR spectrum illustrated with the thin line were not treated thermally.

Referring to FIG. 5, the thin and thick curves have peak points at substantially the same wavelengths. This means that the spin coated only particles have substantially the same chemical property as particles that were also thermally treated. In other words, even though the particles 133 are thermally deformed by heat applied thereto, the chemical properties of the particles 133 is not affected, and the particles 133 have thermal stability.

Figure 6:
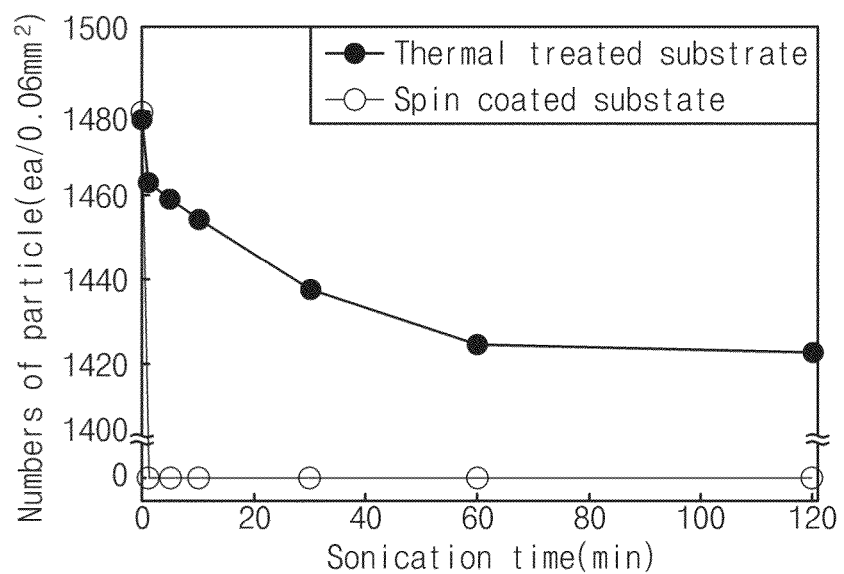
FIG. 6 is an experimental graph showing vibrational stability of the surface structure.

FIG. 6 is an experimental graph showing vibrational stability of the surface structure. In the graph of FIG. 6, the graph illustrated with the thin line was obtained from spin-coated only particles, and the graph illustrated with the thick line was obtained from thermally treated particles.

Referring to FIG. 6, when a sonic wave with a predetermined wavelength was applied to the surface structure for 120 minutes, the spin-coated particles were detached from the substrate before one minute. The number of particles remaining on the substrate was near zero.

By contrast, under the same experimental condition, most of thermally treated particles remained on the substrate. For example, the number of particles was initially 1480, and the final number after 120 minutes was 1420. In other words, for thermally treated particles, 96 percent or more of the particles remained on the second substrate 130, even when a vibration was applied thereto. Thus, when heat is applied to particles attached on the second substrate 130, it is possible to prevent deterioration of the stability of the surface structure by an external vibration.

Figure 7A:
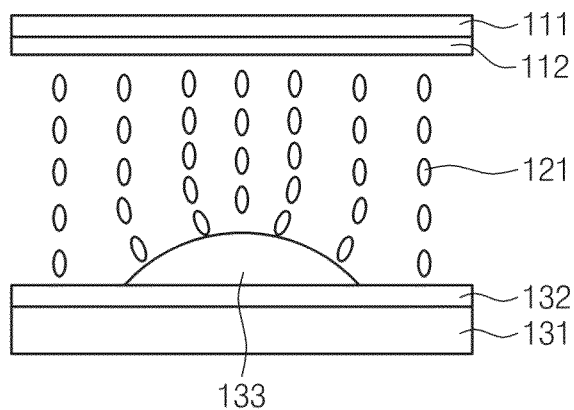
FIGS. 7A and 7B are diagrams showing orientation of liquid crystal molecules in a region A of FIG. 2, in VA mode.
Figure 7B:
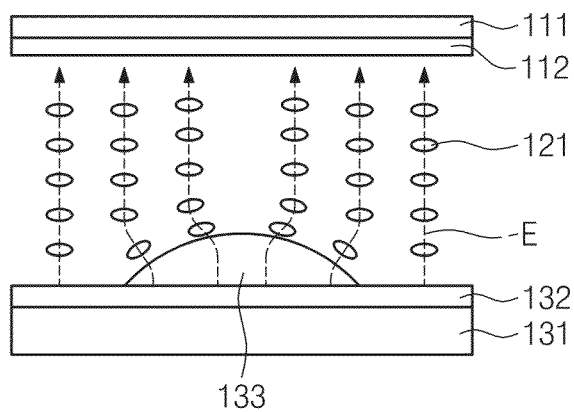

FIGS. 7A and 7B are diagrams showing orientation of liquid crystal molecules in a region A of FIG. 2, in VA mode. FIG. 7A is a diagram showing orientation of liquid crystal molecules, to which an electric field is not applied, and FIG. 7B is a diagram showing orientation of liquid crystal molecules, to which an electric field is applied.

Referring to FIG. 7A, the liquid crystal layer 120 may include a plurality of liquid crystal molecules 121, and the liquid crystal molecules 121 that are spaced apart from the surface structure particle 133 may have a vertical orientation. However, due to the presence of the surface structure particle 133, the liquid crystal molecules 121 that are near the surface structure particle 133 may have an orientation that is slanted with respect to a top surface of the common electrode 132.

Referring to FIG. 7B, when an electric field E is applied between the second substrate 130 and the first substrate 110, the electric field E may be deformed near the surface structure particle 133, due to the presence of the surface structure particle 133. For example, if the electric field E is applied to the liquid crystal molecules 121 of VA mode, the liquid crystal molecules 121 that are spaced apart from the surface structure 133 may have a horizontal orientation, but the liquid crystal molecules 121 that are near the surface structure 133 may have various orientations, due to the presence of the surface structure 133. In addition to the effect caused by the surface structure particle 133, the electric field E near the surface structure particle 133 is deformed, and the liquid crystal molecules 121 may have an orientation perpendicular to the deformed electric field E. As a result, the liquid crystal molecules 121 near the surface structure particle 133 may have a multi-domain orientation.

Figure 8A:
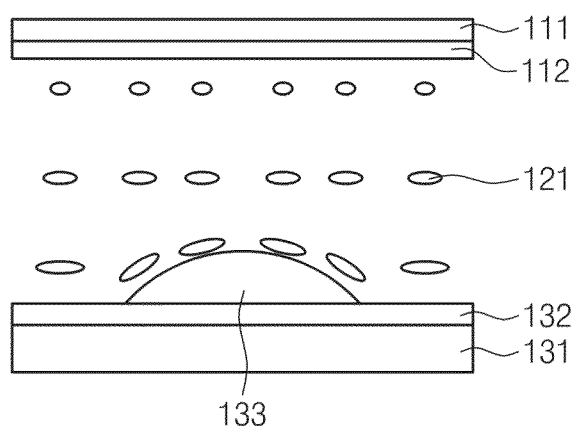
FIGS. 8A and 8B are diagrams showing orientation of liquid crystal molecules in a region A of FIG. 2, in TN mode.
Figure 8B:
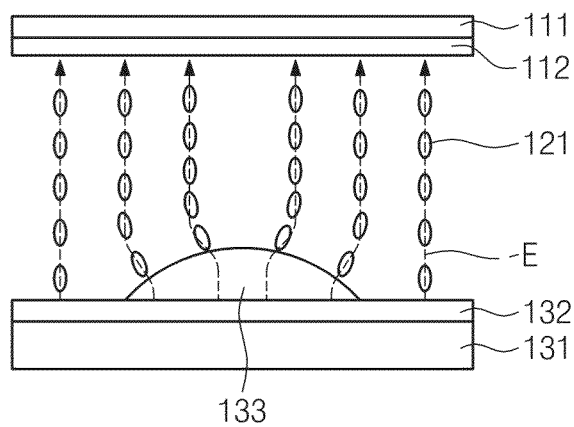

FIGS. 8A and 8B are diagrams showing orientation of liquid crystal molecules in a region A of FIG. 2, in TN mode. FIG. 8A is a diagram showing orientation of liquid crystal molecules, to which an electric field is not applied, and FIG. 8B is a diagram showing orientation of liquid crystal molecules, to which an electric field is applied.

Referring to FIG. 8A, the liquid crystal layer 120 may include a plurality of liquid crystal molecules 121 of TN mode. The liquid crystal molecules 121 that are spaced apart from the surface structure particle 133 may have horizontal orientation parallel to a top surface of the common electrode 132 or twisted orientations, but due to the presence of the surface structure particle 133, the liquid crystal molecules 121 near the surface structure particle 133 may have various orientations that are slanted with respect to a top surface of the common electrode 132. In other words, the liquid crystal molecules 121 near the surface structure particle 133 may have a property of multi-domain orientation.

Referring to FIG. 8B, when an electric field E is applied between the second substrate 130 and the first substrate 110, the electric field E may be deformed near the surface structure particle 133, due to the presence of the surface structure 133. For example, if the electric field E is applied to the liquid crystal molecules 121 of TN mode, the liquid crystal molecules 121 that are spaced apart from the surface structure particle 133 may have a vertical orientation, but the liquid crystal molecules 121 that are near the surface structure particle 133 may have various orientations, due to the presence of the surface structure particle 133 and the deformed electric field E.

Figure 9A:
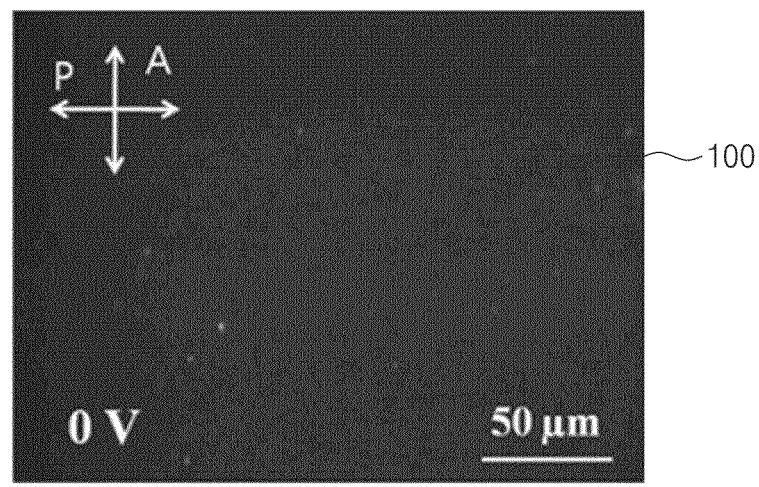
FIGS. 9A through 9D are experimental graphs showing a transmittance property of a liquid crystal display panel of FIG. 1 according to an applied voltage.
Figure 9B:
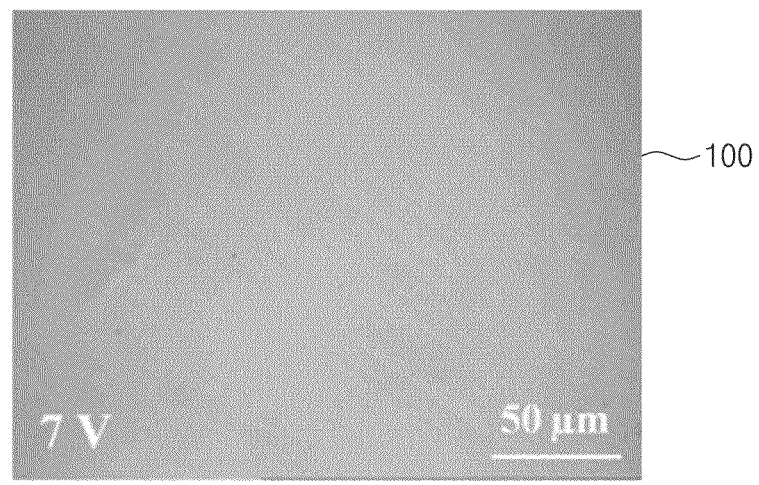
Figure 9C:
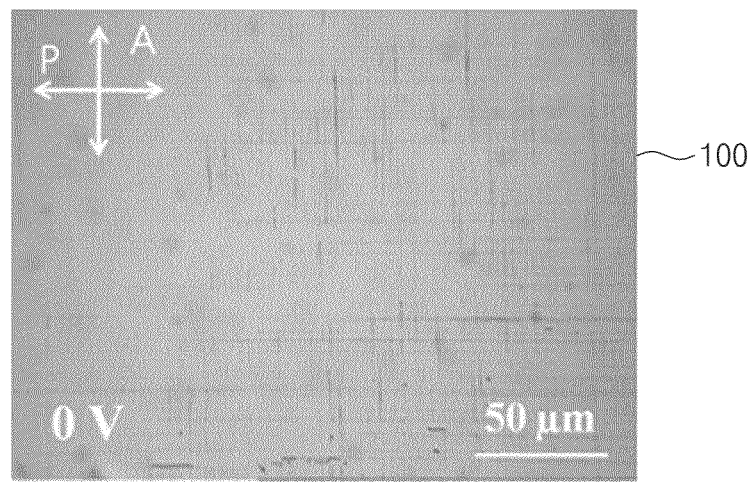

FIGS. 9A through 9D are experimental graphs showing a transmittance property of a liquid crystal display panel of FIG. 1 according to an applied voltage. FIGS. 9A and 9B were obtained from liquid crystal display panels of VA mode, and FIGS. 9C and 9D were obtained from liquid crystal display panels of TN mode. FIGS. 9A and 9C were obtained from liquid crystal display panels, to which an operating voltage is not applied, and FIGS. 9B and 9D were obtained from liquid crystal display panels, to which an operating voltage is applied. Polarization plates (not shown), whose optical axes are perpendicular to each other, may be attached to outer surfaces of the first and second substrates 110 and 130 of the liquid crystal display panel 100.

Referring to FIG. 9A, when a voltage is not applied, the liquid crystal molecules may have orientations as shown in FIG. 7A, such that the panel 100 can be in a uniform black state.

Referring to FIG. 9B, when a voltage (for example, 7V) is applied, the liquid crystal molecules may have orientation perpendicular to the electric field as shown in FIG. 7B, the liquid crystal molecules near the surface structure 133 may have various orientations, such that the panel 100 can be in a uniformly white state.

Referring to FIG. 9C, when a voltage is not applied, the liquid crystal molecules may have twisted orientations as shown in FIG. 8A and the liquid crystal molecules near the surface structure 133 may have various orientations, such that the panel 100 can be in a uniform white state.

Figure 9D:
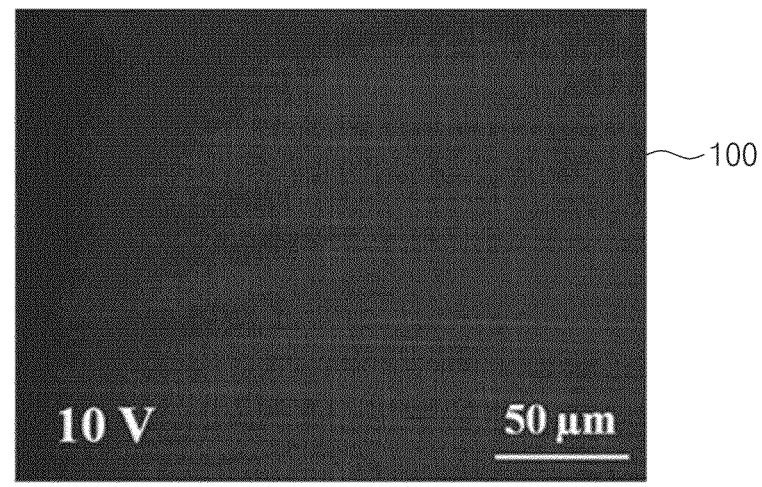

Referring to FIG. 9D, when a voltage (for example, 10V) is applied, the liquid crystal molecules may have orientations as shown in FIG. 8B, such that the panel 100 can be in a uniform black state.

Figure 10A:
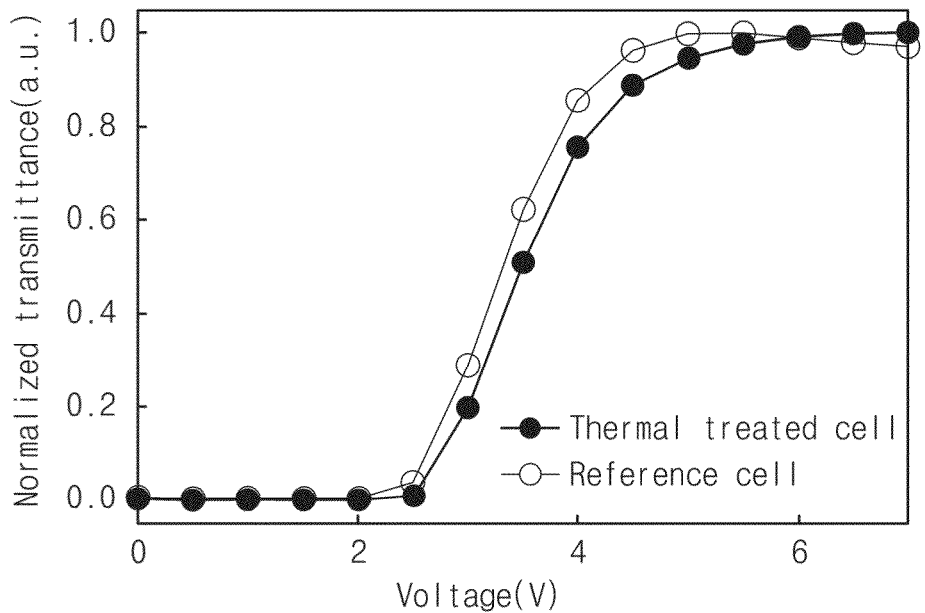
FIGS. 10A and 10B are experimental graphs showing an operating property of a liquid crystal display panel of FIG. 1 according to an applied voltage.
Figure 10B:
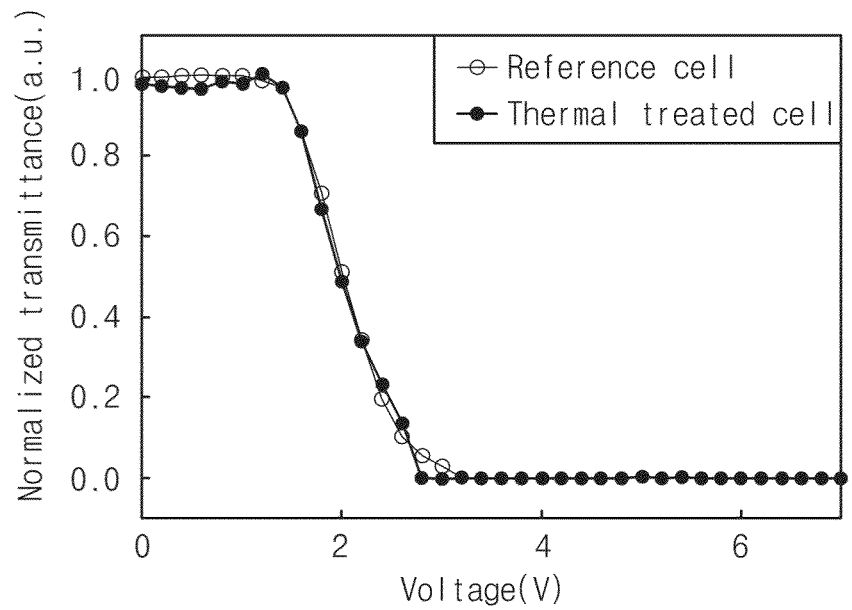

FIGS. 10A and 10B are experimental graphs showing an operating property of a liquid crystal display panel of FIG. 1 according to an applied voltage. FIG. 10A was obtained from a liquid crystal display panel of VA mode, and FIG. 10B was obtained from a liquid crystal display panel of TN mode. The reference cell was obtained from pixels of panel 100 that included particles formed on the common electrode 132 by the spin coating method without performing any thermal treatment. The thermal treated cell was obtained from pixels of panel 100 that included particles formed on the common electrode 132 by the spin coating method and that were then thermally treated. In FIGS. 10A and 10B, the thin line is the graph obtained from a liquid crystal display panel of the reference cell, and the thick line is the graph obtained from a liquid crystal display panel of the thermally treated cell. In FIGS. 10A and 10B, the horizontal and vertical axes represent an applied voltage and a normalized transmittance, respectively.

Referring to FIGS. 10A and 10B, the pixels of the panel 100 including the particles 133 of VA and TN modes, which the thermal treatment is not performed, may have the substantially same transmittance as those after the thermal treatment. That is, when a voltage of 0V is applied to the particles 133 of VA mode, the transmittance value is zero such that the panel 100 will be in a black state as shown in FIG. 9A. However, when a voltage of 6V is applied to the particles 133 of VA mode, the transmittance value is one such that the panel 100 will be in a white state as shown in FIG. 9B.

When a voltage of 0V is applied to the particles 133 of TN mode, the transmittance value is one such that the panel 100 will be in a white state as shown in FIG. 9C. However, when a voltage of 3V or more is applied to the particles 133 of TN mode, the transmittance value is zero such that the panel 100 will be in a black state as shown in FIG. 9D.

Figure 11A:
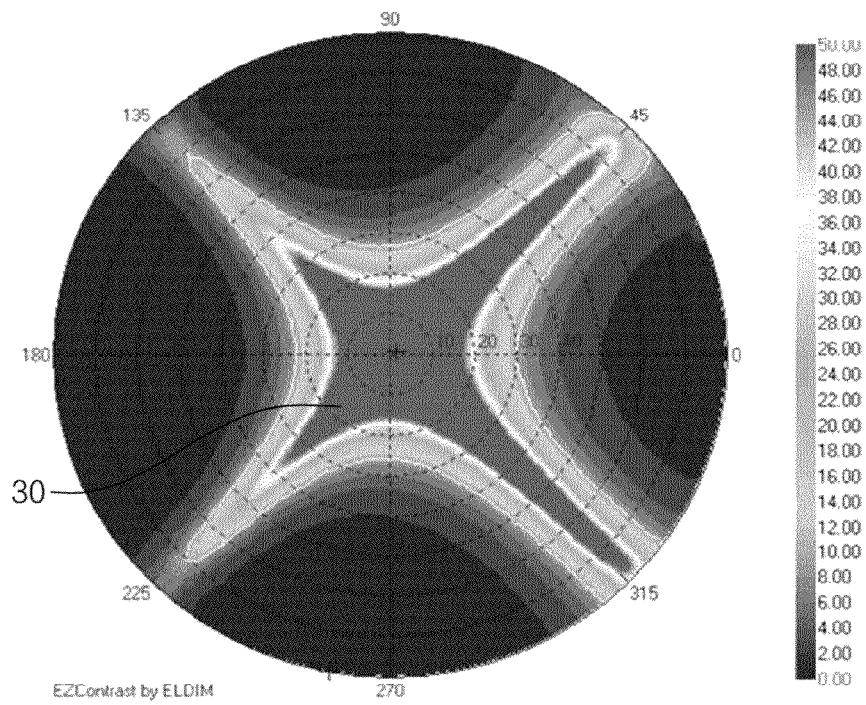
FIGS. 11A through 11D are experimental graphs showing a viewing angle property of a liquid crystal display panel of FIG. 1.
Figure 11B:
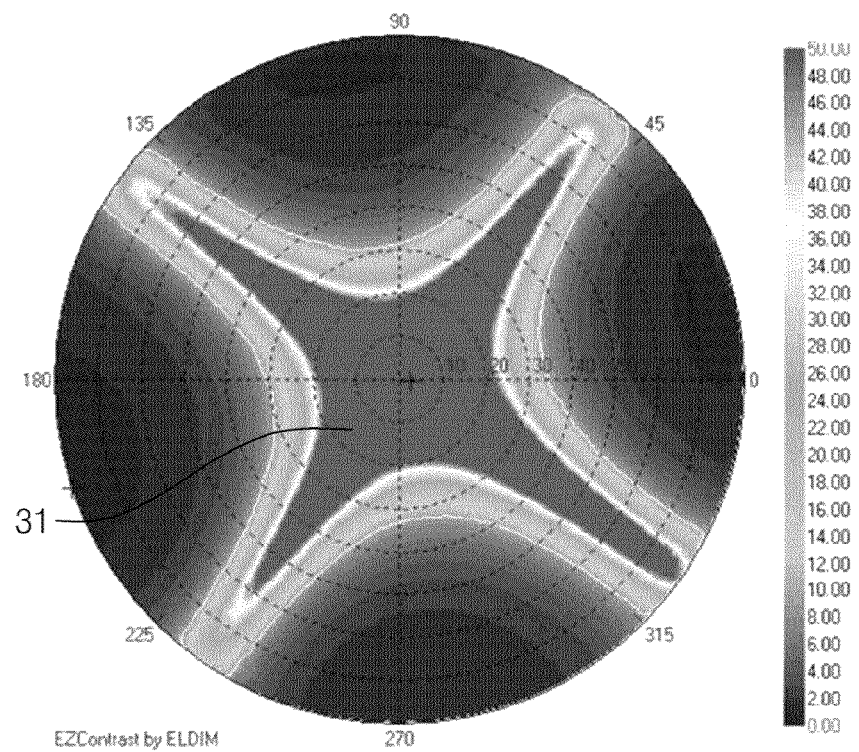
Figure 11C:
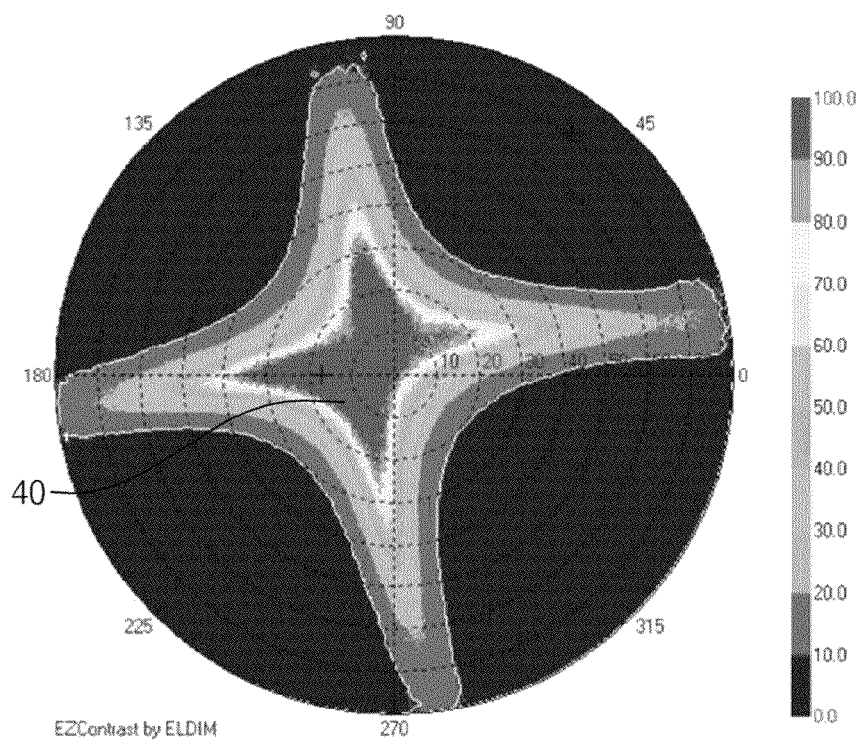
Figure 11D:
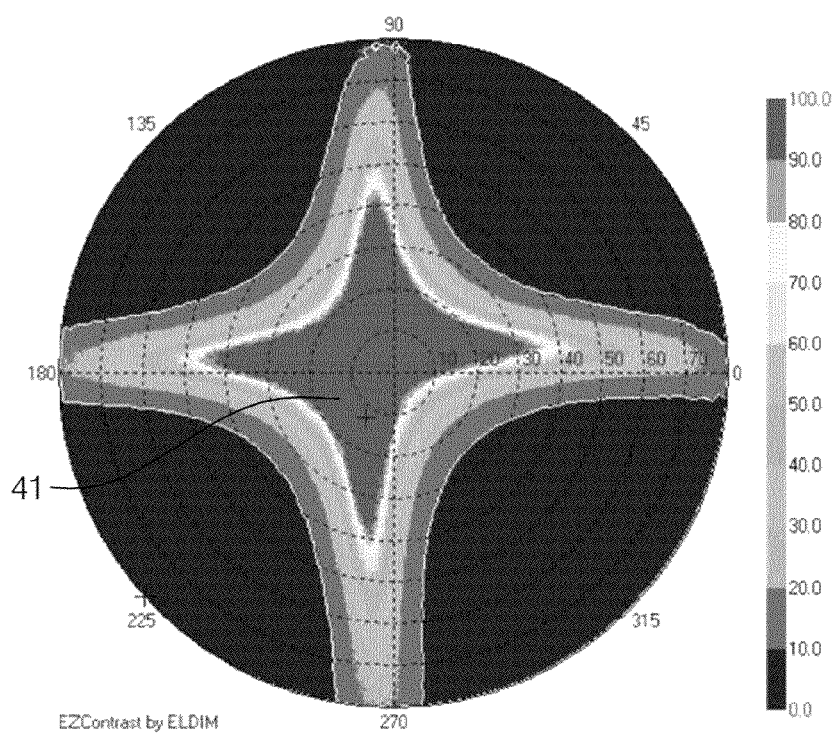

FIGS. 11A through 11D are experimental graphs showing a viewing angle property of a liquid crystal display panel of FIG. 1. FIG. 11A shows a viewing angle property of the VA mode panel 100, in which the surface structure is not provided, and FIG. 11B shows a viewing angle property of the VA mode panel 100 provided with the surface structure having particles 133. FIG. 11C shows a viewing angle property of the TN mode panel 100, in which the surface structure is not provided, and FIG. 11D shows a viewing angle property of the TN mode panel 100 provided with the surface structure having particles 133.

Referring to FIGS. 11A and 11B, an effective viewing angle region 30 of FIG. 11A was more symmetric and wider than an effective viewing angle region 31 of FIG. 11B.

Referring to FIGS. 11C and 11D, an effective viewing angle region 40 of FIG. 11C was more symmetric and wider than an effective viewing angle region 41 of FIG. 11D.

That is, the surface structure can contribute to improve both the symmetry and area of the effective viewing angle region. This may result from various orientations of the liquid crystal molecules caused by the surface structure.

As a result, the liquid crystal display panel 100 according to example embodiments may include the stable surface structure having various sizes. The surface structure may be configured to include particles formed of a transparent material. As a result, it is possible to prevent deterioration of the brightness of the liquid crystal display panel 100.

In addition, the liquid crystal display panel 100 may be configured to have a stable viewing angle property.

While example embodiments have been particularly shown and described, it will be understood by one of ordinary skill in the art that variations in form and detail may be made therein without departing from the spirit and scope of the disclosure including that attached claims.

What is claimed is:

1. A liquid crystal display (LCD) panel, comprising:
a first substrate;
a second substrate facing the first substrate and including a plurality of colloidal particles attached to a surface of the second substrate facing the first substrate by a thermal treatment; and
a liquid crystal layer including liquid crystal molecules interposed between the first and second substrates to contain the liquid crystal molecules,
wherein a size of the colloidal particles varies according to a length of time the thermal treatment is applied and a mean height of the plurality of colloidal particles decreases with an increase of the length of time the thermal treatment is applied.

2. The LCD panel of claim 1, wherein the first substrate comprises a first base substrate and a plurality of pixel electrodes provided on the first base substrate, and
the second substrate comprises a second base substrate and a common electrode provided on the second base substrate,
wherein the plurality of colloidal particles are formed on the common electrode.

3. The LCD panel of claim 2, wherein the plurality of colloidal particles are disposed randomly on the common electrode.

4. The LCD panel of claim 3, wherein the plurality of colloidal particles comprise a transparent material.

5. The LCD panel of claim 3, wherein the plurality of colloidal particles comprise at least one of polystyrene, polyethylene or polypropylene.

6. The LCD panel of claim 3, wherein the length of time the thermal treatment is applied is 10 to 120 minutes, and the size of the colloidal particles is 180 to 500 nanometers.

7. The LCD panel of claim 1, wherein a mean area of each of the plurality of colloidal particles attached on the common electrode increases with an increase of the length of time the thermal treatment is applied.

8. The LCD panel of claim 1, wherein the plurality of colloidal particles are obtained by heating the second substrate to a temperature of about 200 degrees Celsius.

9. The LCD panel of claim 1, wherein the liquid crystal display panel is operated in one of VA and TN modes.

\* \* \* \* \*